United States Patent
Andersson et al.

(10) Patent No.: US 10,293,821 B2
(45) Date of Patent: May 21, 2019

(54) METHOD AND CONTROL UNIT FOR ADJUSTING A TIME GAP

(71) Applicant: Scania CV AB, Södertälje (SE)

(72) Inventors: Håkan Andersson, Ekolsund (SE); Bas Oremus, Södertälje (SE)

(73) Assignee: SCANIA CV AB (SE)

( * ) Notice: Subject to any disclaimer, the term of this patent is extended or adjusted under 35 U.S.C. 154(b) by 39 days.

(21) Appl. No.: 15/535,442

(22) PCT Filed: Jan. 28, 2016

(86) PCT No.: PCT/SE2016/050051
§ 371 (c)(1),
(2) Date: Jun. 13, 2017

(87) PCT Pub. No.: WO2016/122383
PCT Pub. Date: Aug. 4, 2016

(65) Prior Publication Data
US 2017/0349177 A1    Dec. 7, 2017

(30) Foreign Application Priority Data

Jan. 28, 2015   (SE) ...................................... 1550086

(51) Int. Cl.
*B60W 30/00*   (2006.01)
*B60W 30/16*   (2012.01)

(52) U.S. Cl.
CPC ......... *B60W 30/16* (2013.01); *B60W 2400/00* (2013.01); *B60W 2420/52* (2013.01);
(Continued)

(58) Field of Classification Search
CPC .. B60W 30/00; B60W 30/16; B60W 2550/20; B60W 2550/142;
(Continued)

(56) References Cited

U.S. PATENT DOCUMENTS 7,821,421 B2 * 10/2010 Tamir ................. G06Q 30/0283
340/901
8,653,986 B2 * 2/2014 Tamir ................. G06Q 30/0283
340/901
(Continued)

FOREIGN PATENT DOCUMENTS

DE    10 2008 019 174 A1    10/2009
DE    10 2011 121 853 A1     6/2012
(Continued)

OTHER PUBLICATIONS

International Search Resort dated Apr. 14, 2016 in corresponding PCT International Application No. PCT/SE2016/050051.
(Continued)

*Primary Examiner* — Yonel Beaulieu
(74) *Attorney, Agent, or Firm* — Ostrolenk Faber LLP (57) ABSTRACT

A method (400) and a control unit (310) in a vehicle (100) having an ACC system (500) for adjusting a variable time gap (t) to be kept to a preceding vehicle (110), based on a road slope (α). In the method (400): determining (401) geographical position of the vehicle (100); determining (402) driving direction (105) of the vehicle (100); determining (403) the road slope (α) of the road (120) in front of the vehicle (100) in the determined (402) driving direction (105); and adjusting (408) the variable time gap (t) based on the determined (403) road slope (α) of the road (120) in front of the vehicle (100) by: increasing the variable time gap (t) when the road slope (α) is negative, indicating downhill; or decreasing the variable time gap (t) when the road slope (α) is positive, indicating uphill.

15 Claims, 6 Drawing Sheets

(52) U.S. Cl.
CPC ............... *B60W 2550/142* (2013.01); *B60W 2550/143* (2013.01); *B60W 2550/20* (2013.01); *B60W 2550/402* (2013.01); *B60W 2750/308* (2013.01)

(58) Field of Classification Search
CPC ..... B60W 2550/148; B60W 2550/402; B60W 2400/00; B60W 2420/52; B60W 2750/308
See application file for complete search history.

(56) References Cited

U.S. PATENT DOCUMENTS

| | | | |
|---|---|---|---|
| 9,619,203 B2* | 4/2017 | Tamir | ............. G06Q 30/0283 |
| 9,688,278 B2* | 6/2017 | Harda | ............. B60W 30/18163 |
| 2015/0353094 A1* | 12/2015 | Harda | ............. B60W 30/18163 |
| | | | 701/23 |
| 2017/0356983 A1* | 12/2017 | Jeong | ............. G01S 7/4817 |
| 2018/0024246 A1* | 1/2018 | Jeong | ............. G01S 17/89 |
| | | | 359/204.1 |
| 2018/0032086 A1* | 2/2018 | Punithan | ............. G05D 1/0016 |
| 2018/0043896 A1* | 2/2018 | Lee | ............. B60T 1/10 |
| 2018/0093631 A1* | 4/2018 | Lee | ............. B60W 30/095 |
| 2018/0134286 A1* | 5/2018 | Yi | ............. B60W 10/04 |

FOREIGN PATENT DOCUMENTS

| | | |
|---|---|---|
| EP | 1 547 847 A2 | 6/2005 |
| EP | 2 072 316 A2 | 6/2009 |
| EP | 2 072 317 A2 | 6/2009 |
| FR | 2 813 397 A1 | 3/2002 |

OTHER PUBLICATIONS

Written Opinion dated Apr. 14, 2016 in corresponding PCT International Application No. PCT/SE2016/050051.

\* cited by examiner

METHOD AND CONTROL UNIT FOR ADJUSTING A TIME GAP

CROSS REFERENCE TO RELATED APPLICATIONS

The present application is a 35 U.S.C. § 371 national phase of PCT/SE2016/050051, filed Jan. 28, 2016, which claims priority of Sweden Application No. 1550086-1, filed Jan. 28, 2015, the contents of which are incorporated by reference herein. The PCT International Application was published in the English language.

TECHNICAL FIELD

This document discloses a method and a control unit for adjusting a variable time gap to be kept to a preceding vehicle.

BACKGROUND

Adaptive cruise control (ACC), sometimes also called autonomous or radar cruise control, is a cruise control system for vehicles that automatically adjusts the vehicle speed to maintain a safe distance from preceding vehicles. Control of the distance is often imposed based on sensor information from on-board sensors only. The on-board sensors may be for example a radar or a laser sensor, allowing the vehicle to slow down when approaching another, preceding vehicle and accelerate again to a pre-set speed when the preceding vehicle accelerates.

Thus the ACC will attempt to keep a certain distance to the preceding vehicle in front, upon activation of the system. The distance may be depending on an adjustable time gap that the driver has selected, for example between 1-5 seconds. It is often recommended to keep a 3 second time gap to the preceding vehicle, regardless of the speed.

For a better performance/security of the ACC system when driving in hilly terrain, an adaptation of the time slot is sometimes made, depending on the slope of the road. In downhill the distance may be set a little longer, in uphill the distance may be set a little shorter. The estimation of the slope is made by a slope sensor in the following vehicle.

However, when driving in a hilly terrain, the preceding vehicle, or target vehicle, will arrive to a slope before the following vehicle. Thus the target vehicle will be driving uphill, often with reduced speed while the following vehicle still is driving on uninclined or differently inclined ground, and consequently the following vehicle has to brake in order to keep the time gap. Some seconds later, the following vehicle arrives to the uphill and its speed is affected by gravity. Thus, the following vehicle has to accelerate in order to keep the time gap to the target vehicle.

In this example, kinetic energy is firstly braked away, only to be required some seconds later in order to keep the time gap to the target vehicle.

The reverse problem may appear in the opposite situation when the target vehicle starts driving downhill and increases speed due to gravity, while the following vehicle may be driving on uninclined or differently inclined ground, or uphill and thus the following vehicle has to accelerate in order to keep the time gap, and then to start braking some seconds later.

Energy is thereby unnecessarily wasted. Also, the brakes are unnecessarily used, which may lead to need for early replacement due to wear.

The described problems will appear on any vehicle using an ACC system. However, the problems will increase with weight, both for the target vehicle and the following vehicle. In particular heavy vehicles like trucks, busses etc. are affected.

However, another problem is that the target vehicle and the following vehicle may be affected differently when driving uphill, for example. In case the target vehicle is an unloaded vehicle, it may hardly be affected at all by the uphill, while a heavily loaded following vehicle may have to accelerate heavily in order to keep up the pace.

Yet another problem may be that some weather or road conditions may require a prolonged time gap to the target vehicle, such as slippery road due to icy conditions, diesel fuel spills on the road, wet leaves on the road etc.

As these described scenarios, and similar variants of them, will lead to increased fuel consumption, it is desirable to find a solution.

SUMMARY

It is therefore an object of this invention to solve at least some of the above problems and improve an ACC system.

According to a first aspect of the invention, this objective is achieved by a method for use in an ACC system of a vehicle, for adjusting a variable time gap to a preceding vehicle, to be kept based on a road slope. The method comprises determining geographical position of the vehicle. Further, the method comprises determining driving direction of the vehicle. The method also comprises determining the road slope of the road in front of the vehicle in the determined driving direction. Additionally, the method further comprises adjusting the variable time gap based on the determined road slope of the road in front of the vehicle by: increasing the variable time gap when the road slope is negative, indicating downhill; or decreasing the variable time gap when the road slope is positive, indicating uphill.

In a first possible implementation of the method according to the first aspect, the method further comprises determining the road slope of the road at the determined geographical position of the vehicle; and wherein the variable time gap is adjusted based on the difference between the determined road slope at the vehicle and the determined road slope in front of the vehicle by: increasing the variable time gap when the determined road slope in front of the vehicle is smaller than the determined road slope at the vehicle; or decreasing the variable time gap when the determined road slope in front of the vehicle exceeds the determined road slope at the vehicle.

In a second possible implementation of the method according to the first aspect, or according to the first possible implementation thereof, the road slope of the road in front of the vehicle is determined by extracting road slope data associated with at least one geographical position of the road in front of the determined geographical position of the vehicle in the determined driving direction, from a database.

In a third possible implementation of the method according to the first aspect, or according to any previous possible implementation thereof, the road slope of the road in front of the vehicle is determined by extracting road slope data associated with a set of geographical positions of the road in front of the determined geographical position of the vehicle in the determined driving direction, from a database, and computing an average road slope.

In a fourth possible implementation of the method according to the first aspect, or according to any previous possible implementation thereof, the road slope of the road in front of the vehicle is determined at a geographical position of the road situated at a distance in front of the vehicle, corresponding at least to the time gap at the current vehicle velocity.

In a fifth possible implementation of the method according to the first aspect, or according to any previous possible implementation thereof, the method further comprises estimating if the preceding vehicle has a higher, or lower, weight than the vehicle. The adjustment of the variable time gap further comprises: further increasing the variable time gap in downhill when the preceding vehicle has a lower weight than the vehicle; or further decreasing the variable time gap in downhill when the preceding vehicle has a higher weight than the vehicle.

In a sixth possible implementation of the method according to the first aspect, or according to any previous possible implementation thereof, the method further comprises estimating if the preceding vehicle has a higher, or lower, weight/power ratio than the vehicle. The adjustment of the variable time gap further comprises: further decreasing the variable time gap in uphill when the preceding vehicle has a higher weight/power ratio than the vehicle; or further increasing the variable time gap in uphill when the preceding vehicle has a lower weight/power ratio than the vehicle.

In a seventh possible implementation of the method according to the fourth or fifth possible implementation of the method according to the first aspect, the estimation of the weight and/or the estimation of the weight/power ratio of the preceding vehicle is made by analysing previous hill behavior of the preceding vehicle.

In an eighth possible implementation of the method according to the first aspect, or according to any previous possible implementation thereof, the request for obtaining road slope and/or weight and/or weight/power ratio is transmitted to the preceding vehicle over a wireless communication interface. Also, the adjustment of the variable time gap is further based on the obtained value of the road slope at the preceding vehicle, weight or weight/power ratio of the preceding vehicle.

In a ninth possible implementation of the method according to the first aspect, or according to any previous possible implementation thereof, the variable time gap is adjusted linearly with the size of the road slope, within predetermined limits.

In a tenth possible implementation of the method according to the first aspect, or according to any previous possible implementation thereof, the method further comprises detecting slippery road conditions. Also, the variable time gap is adjusted by prolongation, when slippery road conditions are detected.

According to a second aspect of the invention, this objective is achieved by a control unit of an ACC system in a vehicle, for adjusting a variable time gap to be kept to a preceding vehicle, based on a road slope. The control unit is configured for determining geographical position of the vehicle via a positioning unit. Also, the control unit is configured for determining driving direction of the vehicle. In addition, the control unit is configured for determining the road slope of the road in front of the vehicle in the determined driving direction. The control unit is additionally configured for adjusting the variable time gap based on the determined road slope of the road in front of the vehicle by: increasing the variable time gap when the road slope is negative, indicating downhill; or decreasing the variable time gap when the road slope is positive, indicating uphill.

According to a third aspect of the invention, this objective is achieved by a computer program comprising program code for performing a method according to the first aspect, or any possible implementation thereof, when the computer program is executed in the control unit, according to the second aspect.

According to a fourth aspect of the invention, this objective is achieved by an ACC system in a vehicle, for adjusting a variable time gap to be kept to a preceding vehicle, based on a road slope. The system comprises a control unit according to the second aspect. Further the system comprises a radar unit, configured for emitting radio waves and receiving reflections of the emitted radio waves, reflected by the preceding vehicle. Also, the system further comprises a positioning unit, configured for determining geographical position of the vehicle. The system in addition comprises a database configured for storing road slope data associated with geographical positions.

According to a fifth aspect of the invention, this objective is achieved by a vehicle comprising an ACC system according to the fourth aspect.

Thanks to the described aspects, by measuring the road slope in front of the vehicle, instead of at the vehicle, and by adjusting the time gap kept to the preceding vehicle based on the coming road slope, unnecessary braking and acceleration respectively is avoided. Fuel consumption is thereby reduced, while maintaining a safe distance to the preceding vehicle.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF EMBODIMENTS OF THE INVENTION

Embodiments of the invention described herein are defined as a method and a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
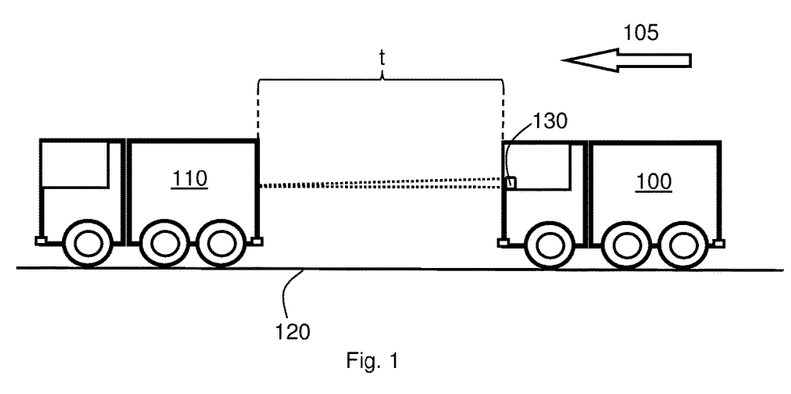
FIG. 1 illustrates a vehicle with an adaptive cruise control system according to a first embodiment of the invention.

FIG. 1 illustrates a scenario with a vehicle 100 with an Adaptive Cruise Control (ACC) system (sometimes also referred to as an Autonomous Intelligent Cruise Control (AiCC) system, driving in a driving direction 105. The ACC system in the vehicle 100 measures a time gap t to a preceding vehicle 110, and automatically adjusts the vehicle speed to maintain the determined time gap t while driving on a road 120.

The time gap t may be variable, based on driver selection in some embodiments, e.g. between 1-3 seconds, or any other appropriate time interval. Thus the length distance in meters between the vehicle 100 and the preceding vehicle 110 will vary with the speed of the vehicles 100, 110, as the time gap t will create a length distance of different length at different vehicle speeds (except when driving at very low speed, approaching a stationary condition, where a certain minimum distance in meters may be desired).

The distance to the preceding vehicle 110 is measured by a radar unit 130, configured for emitting radio waves and receiving reflections of the emitted radio waves, reflected by the preceding vehicle 110. By continuously or at certain time intervals measuring the distance to the preceding vehicle 110 and also continuously or at certain time intervals determining the speed of the vehicle 100, e.g. from the speedometer of the vehicle 100, or from a Global Positioning System (GPS) receiver in the vehicle 100. The time gap t may thereby be calculated by dividing the measured distance in length by the determined speed.

According to some alternative embodiments, another on-board rangefinder sensor may be used instead of the radar unit 130, such as e.g. a laser rangefinder, an ultrasonic sensor emitting an ultrasonic wave and detecting and analyzing the reflections, or other similar devices. However, for clarity, the on-board rangefinder sensor is subsequently referred to as a radar unit 130.

In order to keep the time gap t, signals may be generated for increasing the speed of the vehicle 100, or braking the vehicle 100, respectively. A safe distance is thereby upheld to the preceding vehicle 110.

The vehicle 100 and the preceding vehicle 110 may comprise e.g. a truck, a bus, a car, a motorcycle or any similar vehicle or other means of conveyance. The vehicle 100 and the preceding vehicle 110 may comprise vehicles of the same, or different types.

The vehicle 100 and the preceding vehicle 110 may be driver controlled or driverless autonomously controlled vehicles in different embodiments. However, for enhanced clarity, the vehicle 100 is subsequently described as having a driver.

Figure 2A:
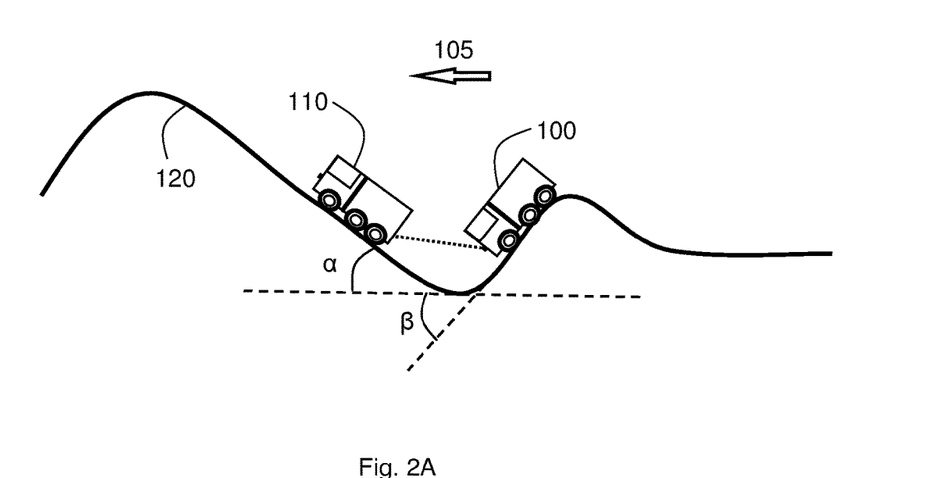
FIG. 2A illustrates vehicles according to the first embodiment of the invention in a first hilly region.

FIG. 2A illustrates an example of a scenario where the vehicles 100, 110 presented in FIG. 1 have arrived to a hilly region.

Thus the preceding vehicle 110 is driving uphill, at a road slope α of the road 120, in front of the vehicle 100 in the driving direction 105, while the vehicle 100 is driving downhill at a downhill slope β.

The road slope α may be determined at different geographical positions in front of the vehicle 100 in the driving direction 105, such as e.g. just in front of the vehicle 100, somewhere between the vehicle 100 and the preceding vehicle 110, at the geographical position of the preceding vehicle 110, and/or at a geographical position in front of the preceding vehicle 110 in different embodiments.

As previously discussed in the background section, the time gap t in previously known solutions is adjusted by prolongation when the vehicle 100 is driving in uphill, and vice versa in downhill, as measured by the vehicle 100 by determining the current road slope β.

However, according to embodiments of the invention, the road slope α of the road 120 in front of the vehicle 100 in the driving direction 105 is used instead. Thereby, the ACC system can adjust the speed by accepting a shortened time gap t in this situation, as it is known that an uphill slope soon will follow the current downhill slope, which will reduce the speed of the vehicle 100.

Thereby, it is avoided to brake the vehicle 100 in the downhill in order to keep the time gap t, as the vehicle 100 will be driving uphill just an instant later.

The time gap t may be decreased by e.g. 1-15% in some non-limiting embodiments. Thus when t has been set to 3 seconds by the driver, the uphill time gap t may be set to 2.55-2.99 seconds, or there about. The uphill time gap t is thus set when there is an uphill slope α ahead of the vehicle 100. In some embodiments, the time gap t may be adjusted linearly with the size of the road slope α ahead of the vehicle 100, within predetermined limits. Such limits may be e.g. 85%-115%, or similar, in some embodiments.

Figure 2B:
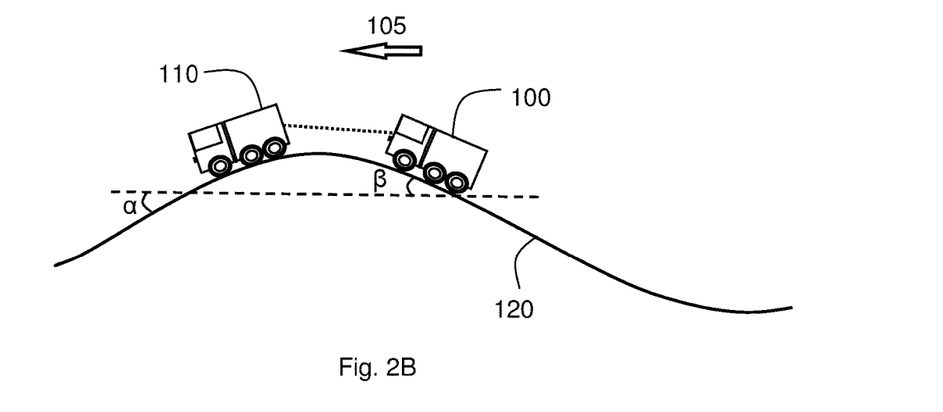
FIG. 2B illustrates vehicles according to the first embodiment of the invention in a second hilly region.

FIG. 2B illustrates an example of a scenario where the preceding vehicle 110 just has passed a hill and has started to drive downhill while the vehicle 100 is driving uphill at the slope β.

By retrieving the ahead slope α of the road 120 in front of the vehicle 100 in the driving direction 105, the ACC system knows that a downhill slope soon will follow, where the vehicle 100 will gain speed from gravity influence. Thus the time gap t may be prolonged in this situation.

It is thereby avoided that an unnecessary increase of speed of the vehicle is made while driving in uphill, as the vehicle 100 will catch up when driving in downhill some seconds later. Energy is thereby saved.

The time gap t may be increased by e.g. 1-15% in some non-limiting embodiments. Thus when t has been set to 3 seconds by the driver, the downhill time gap t may be set to 3.01-3.45 seconds, or there about. The downhill time gap t is thus set when there is a downhill slope α ahead of the vehicle 100. In some embodiments, the time gap t may be adjusted linearly with the size of the road slope α ahead of the vehicle 100, within predetermined limits. Such limits may be e.g. 85%-115%, or similar, in some embodiments.

Figure 3A:
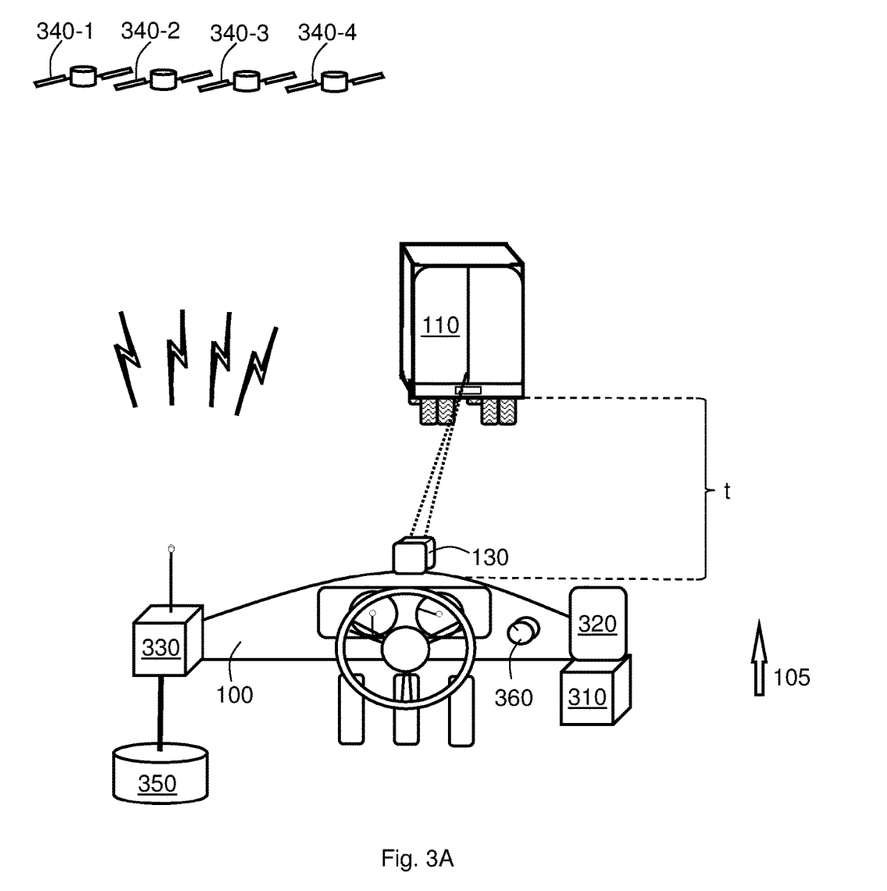
FIG. 3A schematically illustrates how a driver of a vehicle perceives FIGS. 1, 2A and 2B.

FIG. 3A illustrates an example of how the previously scenario in FIG. 1, FIG. 2A and FIG. 2B may be perceived by the driver of the vehicle 100.

The vehicle 100 thus follows the preceding vehicle 110 at a variable time gap t, by means of an ACC system in the vehicle 100. The vehicle 100 comprises a control unit 310 configured for controlling the ACC system. In some embodiments, an optional display 320 may be comprised in the vehicle 100, connected to the control unit 310. Thereby, information is displayed associated with the ACC system such as e.g. current size of the time gap t, current road slope α ahead of the vehicle 100, current road slope β at the vehicle 100, geographical position of the vehicle 100, etc.

Further, the vehicle 100 comprises a positioning unit 330. The positioning unit 330 may be based on a satellite navigation system such as the Navigation Signal Timing and Ranging (Naystar) Global Positioning System (GPS), Differential GPS (DGPS), Galileo, GLONASS, or the like. Thus the positioning unit 330 may comprise a GPS receiver.

The geographical position of the vehicle 100 may be determined continuously or at certain predetermined or configurable time intervals according to various embodiments.

Positioning by satellite navigation is based on distance measurement using triangulation from a number of satellites 340-1, 340-2, 340-3, 340-4. The satellites 340-1, 340-2, 340-3, 340-4 continuously transmit information about time and date (for example, in coded form), identity (which satellite 340-1, 340-2, 340-3, 340-4 which broadcasts), status, and where the satellite 340-1, 340-2, 340-3, 340-4 are situated at any given time. GPS satellites 340-1, 340-2, 340-3, 340-4 send information encoded with different codes, for example, but not necessarily based on Code Division Multiple Access (CDMA). This allows information from an individual satellite 340-1, 340-2, 340-3, 340-4 to be distinguished from the others' information, based on a unique code for each respective satellite 340-1, 340-2, 340-3, 340-4. This information can then be transmitted to be received by the appropriately adapted positioning unit 330 in the vehicle 100.

Distance measurement can according to some embodiments comprise measuring the difference in the time it takes for each respective satellite signal transmitted by the respective satellites 340-1, 340-2, 340-3, 340-4, to reach the positioning unit 330. As the radio signals travel at the speed of light, the distance to the respective satellite 340-1, 340-2, 340-3, 340-4 may be computed by measuring the signal propagation time.

The positions of the satellites 340-1, 340-2, 340-3, 340-4 are known, as they continuously are monitored by approximately 15-30 ground stations located mainly along and near the earth's equator. Thereby the geographical position, i.e. latitude and longitude, of the vehicle 100 may be calculated by determining the distance to at least three satellites 340-1, 340-2, 340-3, 340-4 through triangulation. For determination of altitude, signals from four satellites 340-1, 340-2, 340-3, 340-4 may be used according to some embodiments.

Having determined the geographical position of the vehicle 100, and also determined the driving direction 105 of the vehicle 100, the control unit 310 may extract a road slope α at a geographical position of the road 120 in front of the vehicle 100 in the determined driving direction 105. As stated before, the road slope α may be determined e.g. just in front of the vehicle 100, somewhere between the vehicle 100 and the preceding vehicle 110, at the geographical position of the preceding vehicle 110 and/or at a geographical position in front of the preceding vehicle 110 in different embodiments. This position, i.e. the geographical position in front of the vehicle 100 where the road slope α is determined, may be configurable by the driver in some embodiments and/or may be dependent of the speed of the vehicle 100, such that low speed is associated with a short distance ahead and high speed is associated with a long distance ahead, in some embodiments.

The road slope α at the geographical position of the road 120 in front of the vehicle 100 may be extracted from a database 350. The database 350 may be situated within the vehicle 100 in some embodiments, or alternatively external to the vehicle 100, and accessible by the ACC system.

In the database 350, different geographical positions are stored associated with a respective road slope value α, β, which may be extracted by using a geographical position and a direction as input values.

Further, a knob control 360 is illustrated, on which the driver may adjust the time gap t, within certain predetermined limits. In other embodiments, other alternative control, lever, switch, slider, button, key or similar means for adjusting the time gap t.

Figure 3B:
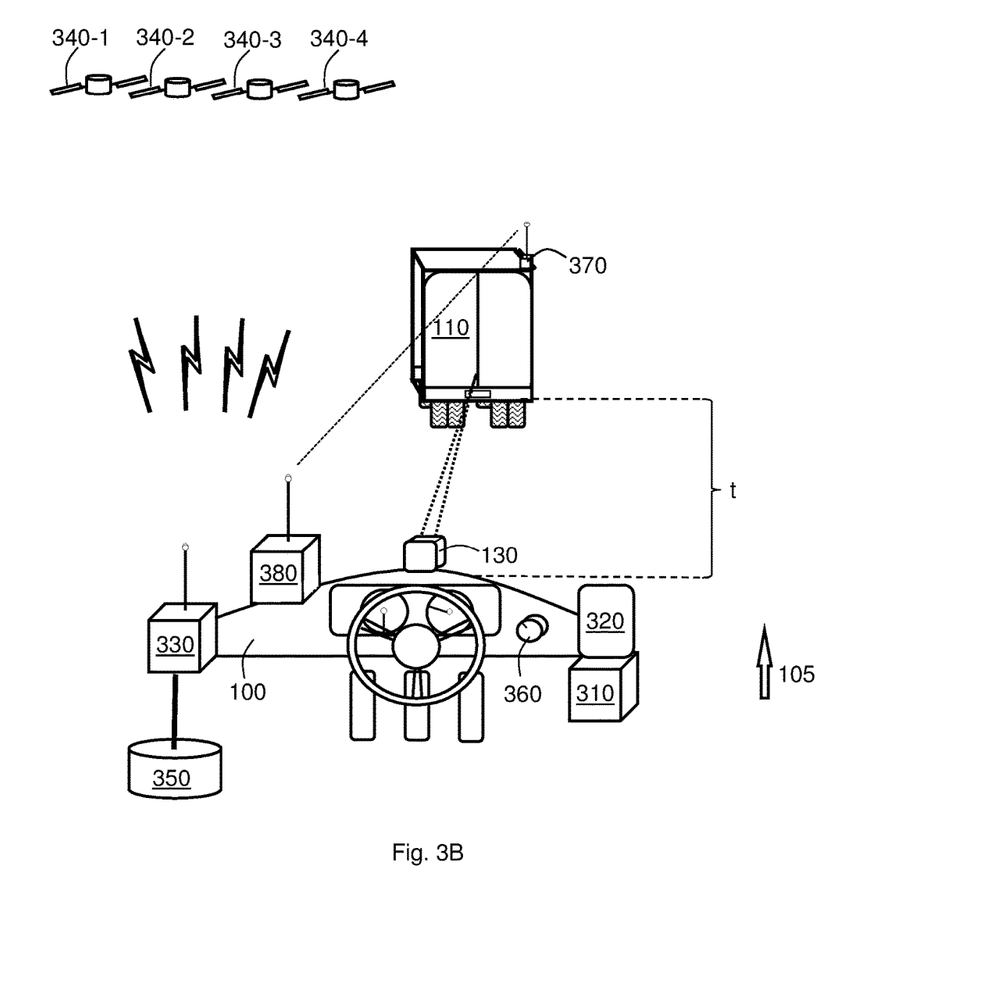
FIG. 3B schematically illustrates how a driver of a vehicle perceives an alternate embodiment of the vehicle.

FIG. 3B also illustrates an example of an alternative embodiment of the vehicle 100, previously discussed in conjunction with the presentation of FIG. 3A.

In this embodiment, the preceding vehicle 110 has a wireless transmitter 370. The wireless transmitter 370 is configured for transmitting wireless signals, to be received by a wireless receiver 380 in the vehicle 100.

The wireless signal may be e.g. a Vehicle-to-Vehicle (V2V) signal, or any other wireless signal based on, or at least inspired by wireless communication technology such as Wi-Fi, Wireless Local Area Network (WLAN), Ultra Mobile Broadband (UMB), Bluetooth (BT), or infrared transmission to name but a few possible examples of wireless communications.

According to some embodiments, the road slope α may be measured by the preceding vehicle 110, by e.g. an inclination meter in the preceding vehicle 110. The measured road slope α at the geographical position of the preceding vehicle 110 may be measured continuously, or at certain intervals, and transmitted via the wireless transmitter 370, to be received by the wireless receiver 380 in the vehicle 100.

The reason for this alternative embodiment may be e.g. that there is no slope data stored in the database 350 for the current geographical position, or that the stored slope data is incorrect or obsolete. Another reason may be that the vehicle 100 has no positioning unit 330, satellites 340-1, 340-2, 340-3, 340-4 are out of reach and/or the database 350 is out of function, or out of reach in case the database 350 is external to the vehicle 100.

An embodiment of the method may thereby be performed independently of pre-stored GPS data, e.g. on a recently constructed road.

Figure 4:
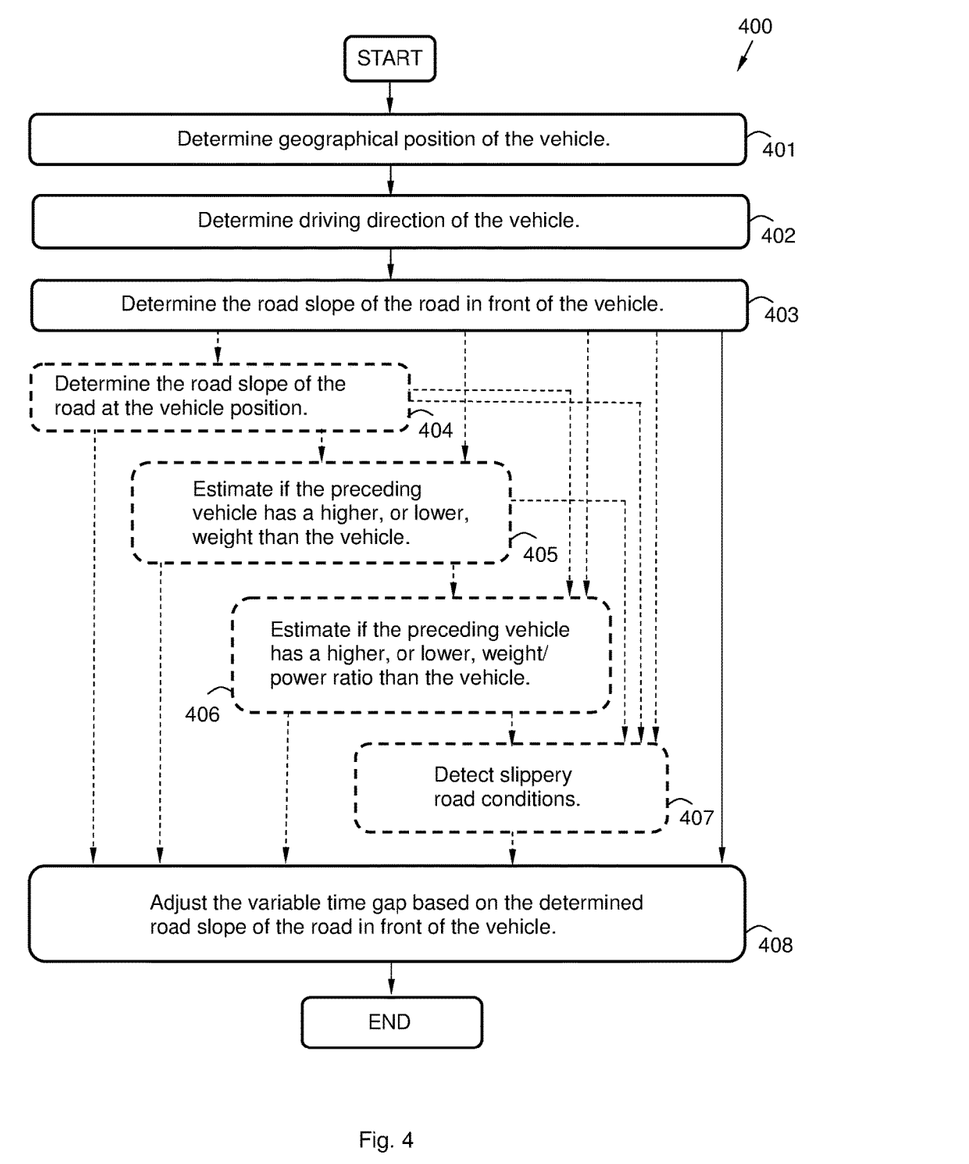
FIG. 4 is a flow chart illustrating an embodiment of a method.

FIG. 4 illustrates an example of a method 400 according to an embodiment. The flow chart in FIG. 4 shows the method 400 for use in an ACC system of a vehicle 100, for adjusting a variable time gap t to be kept to a preceding vehicle 110, based on a road slope α. The road slope α of the road 120 is determined at a geographical position in front of the vehicle 100.

The vehicle 100 may be any arbitrary kind of means for conveyance, such as a truck, a bus or a car.

In order to correctly be able to adjust the variable time gap t, the method 400 may comprise a number of steps 401-408. However, some of these steps 401-408 may be performed solely in some alternative embodiments, like e.g. steps 404-407. Further, the described steps 401-408 may be performed in a somewhat different chronological order than the numbering suggests. The method 400 may comprise the subsequent steps:

Step 401 comprises determining geographical position of the vehicle 100. The geographical position may be determined based on GPS positioning in some embodiments, or positioning based on any other satellite navigation system.

Step 402 comprises determining driving direction 105 of the vehicle 100. The driving direction 105 of the vehicle 100 may be determined based on the location of the destination of the journey, or by extrapolating the driving direction based on previously determined geographical positions and possibly knowledge of the road direction, e.g. from stored map data.

Step 403 comprises determining the road slope α of the road 120 in front of the vehicle 100 in the determined 402 driving direction 105. The road slope α of the road 120 in front of the vehicle 100 may be determined by extracting road slope data associated with at least one geographical position of the road 120 in front of the determined 401 geographical position of the vehicle 100 in the determined 402 driving direction 105, from a database 350.

In some embodiments, the road slope α of the road 120 in front of the vehicle 100 may be determined by extracting road slope data from a plurality of positions, instead of only one singular point. Thus road slope data from a set of geographical positions of the road 120 in front of the determined 401 geographical position of the vehicle 100 in the determined 402 driving direction 105 may be extracted from the database 350. Further, an average road slope α may be computed of the road slope data from the plurality of positions.

Computing the average road slope α from several positions, instead of only measuring the road slope α in one singular point, avoids the method 400 and the computations being based on roughness or unevenness at that one singular point. Thus more reliable computations may be made.

The road slope α of the road 120 in front of the vehicle 100 may in some embodiments be determined at a geographical position of the road 120 situated at a distance in front of the vehicle 100, corresponding at least to the time gap t at the current vehicle velocity. However, in other embodiments, the road slope α may be determined at any geographical position of the road 120 between the vehicle 100 and the preceding vehicle 110, or at the geographical position of the preceding vehicle 110, or at a geographical position in front of the preceding vehicle 110.

In some embodiments, a request for obtaining the road slope α may be transmitted, to be received by the preceding vehicle 110 by a wireless signal. The mentioned wireless signal may be based on, or at least inspired by wireless communication technology such as V2V, Wi-Fi, Wireless Local Area Network (WLAN), Ultra Mobile Broadband (UMB), Bluetooth (BT), or infrared transmission to name but a few possible examples of wireless communications.

Step 404, which may be performed only in some embodiments, comprises determining the road slope β of the road 120 at the determined 401 geographical position of the vehicle 100.

Step 405, which may be performed only in some embodiments, comprises estimating if the preceding vehicle 110 has a higher, or lower, weight than the vehicle 100. The estimation 405 of the weight of the preceding vehicle 110 may be made by analysing previous hill behavior of the preceding vehicle 110. However, in some embodiments, the weight of the preceding vehicle 110 may be obtained from the preceding vehicle 110 via a wireless transmission. Thus a request for obtaining weight may be transmitted to the preceding vehicle 110 over a wireless communication interface. The weight of the vehicle 100 may be measured by a weight sensor on the vehicle 100, or may be estimated based on the load in some embodiments.

Step 406 which may be performed only in some embodiments, comprises estimating if the preceding vehicle 110 has a higher, or lower, weight/power ratio than the vehicle 100. The weight/power ratio, or power loading, is a calculation commonly applied to vehicles in general, to enable the comparison of one vehicle's performance to another. It is used as a measurement of performance of a vehicle as a whole, with the weight (or mass) of the vehicle divided by the engine's power output, to give a metric that is independent of the vehicle's size.

The estimation of the weight/power ratio of the preceding vehicle 110 may be made by analyzing previous hill behavior of the preceding vehicle 110. Such analysis may comprise continuous determination of speed and/or speed change of the preceding vehicle 110 in conjunction with road slope change/size. However, in some embodiments, the weight/power ratio of the preceding vehicle 110 may be obtained from the preceding vehicle 110 via a wireless transmission. Thus a request for obtaining a weight/power ratio may be transmitted to the preceding vehicle 110 over a wireless communication interface. The weight/power ratio of the vehicle 100 may be measured by a weight sensor on the vehicle 100, or estimated may be based on the load in some embodiments, and a stored power value.

Step 407, which may be performed only in some embodiments, comprises detecting slippery road conditions. Slippery road conditions may be detected by measuring outside temperature at the vehicle 100 in some embodiments. The temperature may be measured by a thermometer at the vehicle 100, adapted to measure the outside temperature and thereby estimate the temperature of the road 120. Alternatively, slippery road conditions may be detected by detecting slipping wheels of the vehicle 100, e.g. by a sensor.

Step 408 comprises adjusting the variable time gap t based on the determined 403 road slope α of the road 120 in front of the vehicle 100 by increasing the variable time gap t when the road slope α is negative, indicating downhill, or decreasing the variable time gap t when the road slope α is positive, indicating uphill.

In some embodiments, wherein the road slope β of the road 120 has been determined 404 at the determined 401 geographical position of the vehicle 100, the variable time gap t may be adjusted based on a difference between the determined 404 road slope β at the vehicle 100 and the determined 403 road slope α in front of the vehicle 100 by increasing the variable time gap t when the determined 403 road slope α in front of the vehicle 100 is smaller than the determined 404 road slope β at the vehicle 100, or decreasing the variable time gap t when the determined 403 road slope α in front of the vehicle 100 exceeds the determined 404 road slope β at the vehicle 100.

The adjustment of the variable time gap t further may comprise, according to some embodiments, wherein the weight of the vehicle 100 and the preceding vehicle 110 have been estimated 405, by further increasing the variable time gap t in downhill when the preceding vehicle 110 has a lower weight than the vehicle 100 or by further decreasing the variable time gap t in downhill when the preceding vehicle 110 has a higher weight than the vehicle 100.

Increasing the variable time gap t in downhill when the preceding vehicle 110 has a lower weight than the vehicle 100, avoids the vehicle 100 having to brake in order to avoid collision, as the heavier vehicle 100 will gain more speed in downhill as the higher potential energy is converted into kinetic energy. In the opposite situation, in case the preceding vehicle 110 has a higher weight than the vehicle 100, the preceding vehicle 110 will gain more speed in downhill as its higher potential energy is converted into more kinetic energy and thereby into higher speed. Thus, the variable time gap t may be decreased in downhill.

The adjustment of the variable time gap t may in some embodiments, wherein the weight/power ratio of the vehicle 100 and the preceding vehicle 110 has been estimated 406 comprises further decreasing the variable time gap t in uphill when the preceding vehicle 110 has a higher weight/power ratio than the vehicle 100 or further increasing the variable time gap t in uphill when the preceding vehicle 110 has a lower weight/power ratio than the vehicle 100.

Increasing the variable time gap t in uphill when the preceding vehicle 110 has a lower weight/power ratio than the vehicle 100, avoids that the vehicle 100 having to brake in order to avoid collision, as the weaker preceding vehicle 110 will slowly in comparison with the vehicle 100 in the uphill. In the opposite situation, in case the preceding vehicle 110 has a higher weight/power ratio than the vehicle 100, the variable time gap t may decrease, as the vehicle 100 will lag in comparison with the preceding vehicle 110 in the uphill.

The adjustment of the variable time gap t may be further based on the obtained value of the road slope α at the preceding vehicle 110 and/or weight and/or weight/power ratio of the preceding vehicle 110.

In some embodiments, when slippery road conditions have been detected 407, the variable time gap t may be adjusted by prolongation when slippery road conditions are detected. For example, the time gap t may be prolonged when the outside temperature indicates increased risk of ice formation. The risk of ice formation on the road 120 may be increased at 4 degrees Celsius, 3 degrees Celsius, etc. or lower.

Figure 5:
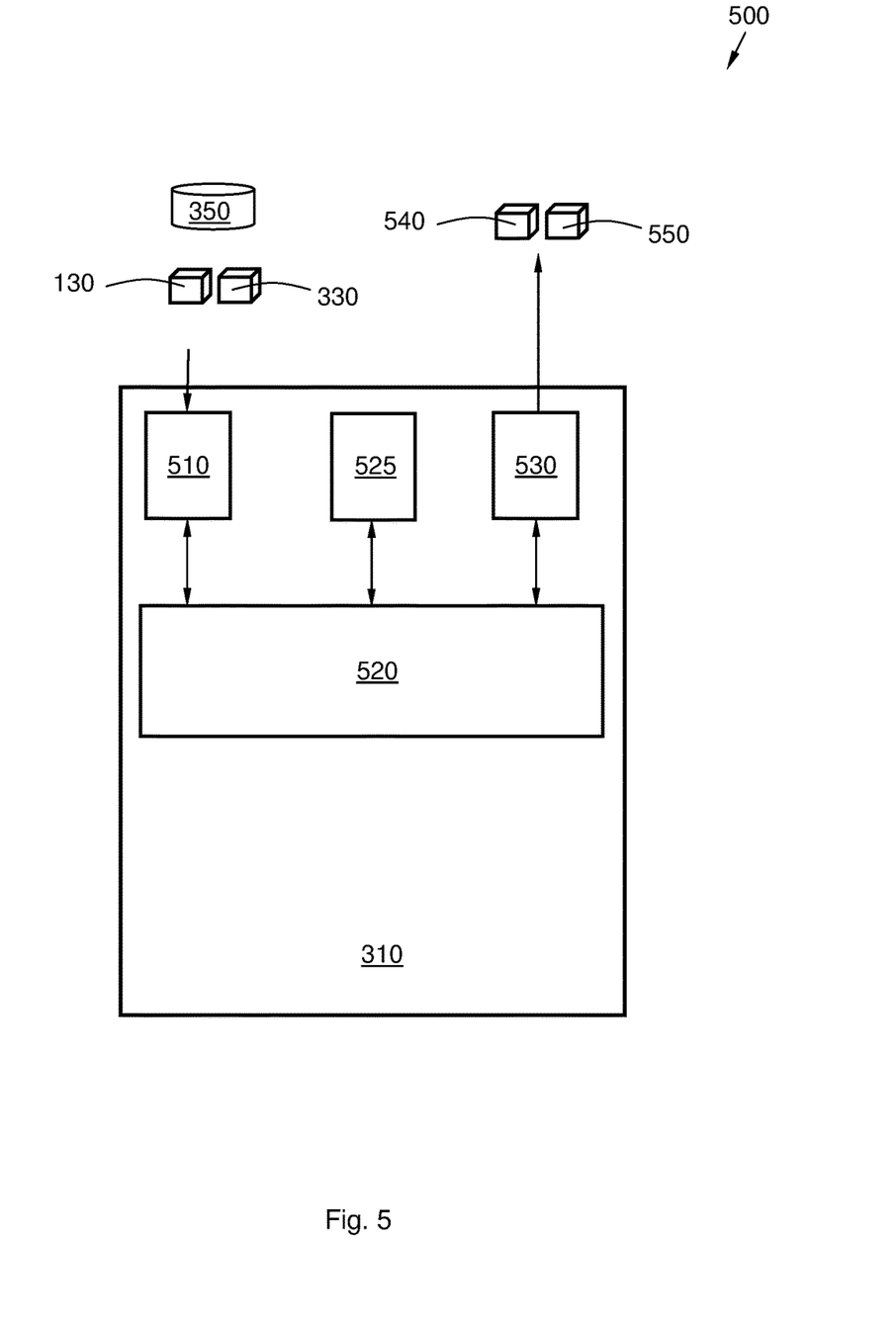
FIG. 5 schematically illustrates an embodiment of a vehicle with an adaptive cruise control system.

FIG. 5 illustrates an embodiment of an Adaptive Cruise Control (ACC) system 500 in a vehicle 100. The ACC system 500 is configured for adjusting a variable time gap t to be kept to a preceding vehicle 110, based on a road slope α. The road slope α is determined at a geographical position of the road 120 in front of the vehicle 100, such as e.g. just in front of the vehicle 100, at a geographical point in between the vehicle 100 and the preceding vehicle 110, at the position of the preceding vehicle 110, or at a geographical point in front of the preceding vehicle 110 in different embodiments.

The ACC system 500 may perform at least some of the previously described steps 401-408 according to the method 400 described above and illustrated in FIG. 4 for adjusting a variable time gap t to be kept to a preceding vehicle 110, based on a road slope α at a geographical position ahead of the vehicle 100.

The ACC system 500 comprises a radar unit 130, configured for emitting radio waves and receiving reflections of the emitted radio waves, reflected by the preceding vehicle 110. Further, the ACC system 500 comprises a positioning unit 330, configured for determining a geographical position of the vehicle 100. The ACC system 500 also comprises a database 350 configured for storing road slope data associated with geographical positions. The database 350 may be comprised in the vehicle 100, or may be external to the vehicle 100, but accessible via a wireless interface. Furthermore, the ACC system 500 additionally comprises a control unit 310.

The control unit 310 is configured for determining geographical position of the vehicle 100 via a positioning unit 330. Further, the control unit 310 is configured for determining a driving direction 105 of the vehicle 100. The control unit 310 is also configured for determining the road slope α of the road 120 in front of the vehicle 100 in the determined driving direction 105. The control unit 310 is additionally configured for adjusting the variable time gap t based on the determined road slope α of the road 120 in front of the vehicle 100 by increasing the variable time gap t when the road slope α is negative, indicating downhill; or by decreasing the variable time gap t when the road slope α is positive, indicating uphill.

In some embodiments, the control unit 310 may be configured for determining the road slope β of the road 120 at the determined geographical position of the vehicle 100. The control unit 310 may also be configured for adjusting the variable time gap t, based on the difference between the determined road slope β at the vehicle 100 and the determined road slope α in front of the vehicle 100 by: increasing the variable time gap t when the determined road slope α in front of the vehicle 100 is smaller than the determined road slope β at the vehicle 100; or decreasing the variable time gap t when the determined road slope α in front of the vehicle 100 exceeds the determined road slope β at the vehicle 100.

Further, in some embodiments, the control unit 310 may also be configured for determining the road slope α of the road 120 in front of the vehicle 100 by extracting road slope data associated with at least one geographical position of the road 120 in front of the determined geographical position of the vehicle 100 in the determined driving direction 105, from a database 350.

In some further embodiments, the control unit 310 may also be configured for determining the road slope α of the road 120 in front of the vehicle 100 by extracting road slope data associated with a set of geographical positions of the road 120 in front of the determined geographical position of the vehicle 100 in the determined driving direction 105, from a database 350, and computing an average road slope α.

Further the control unit 310 may also be configured in some embodiments for determining the road slope α of the road 120 in front of the vehicle 100 at a geographical position of the road 120 situated at a distance in front of the vehicle 100, corresponding at least to the time gap t at the current vehicle velocity.

Also, in some embodiments, the control unit 310 may be configured for estimating if the preceding vehicle 110 has a higher, or lower, weight than the vehicle 100. Also, the control unit 310 may be configured for adjusting the variable time gap t by further increasing the variable time gap t in downhill when the preceding vehicle 110 has a lower weight than the vehicle 100; or further decreasing the variable time gap t in downhill when the preceding vehicle 110 has a higher weight than the vehicle 100.

In some embodiments, the control unit 310 may be configured for estimating if the preceding vehicle 110 has a higher, or lower, weight/power ratio than the vehicle 100. Further, the control unit 310 may be configured for adjusting the variable time gap t by further decreasing the variable time gap t in uphill when the preceding vehicle 110 has a higher weight/power ratio than the vehicle 100; or further increasing the variable time gap t in uphill when the preceding vehicle 110 has a lower weight/power ratio than the vehicle 100.

In further embodiments, the control unit 310 may be configured for estimating the weight and/or estimating the weight/power ratio of the preceding vehicle 110 by analyzing previous hill behavior of the preceding vehicle 110.

The control unit 310 may further be configured for generating a request for obtaining road slope α and/or weight and/or weight/power ratio is transmitted to the preceding vehicle 110 over a wireless communication interface. Further, the control unit 310 may be configured for adjusting the variable time gap t based on the obtained value of the road slope α at the preceding vehicle 110 and/or weight and/or weight/power ratio of the preceding vehicle 110.

Further, the control unit 310 may further be configured for linearly adjusting the variable time gap t, with the size of the road slope α, within predetermined limits, in some embodiments.

The control unit 310 may be configured for detecting slippery road conditions. Also, the control unit 310 may be configured for adjusting the variable time gap t by prolongation, when slippery road conditions are detected.

The control unit 310 may comprise a receiving circuit 510 configured for receiving a signal from a sensor 130, a positioning unit 330 and/or a database 350.

The control unit 310 may also comprise a processor 520 configured for performing at least some of the calculating or computing of the control unit 310. Thus the processor 520 may be configured for determining a geographical position of the vehicle 100 via a positioning unit 330. Further, the processor 520 may be further configured for determining a driving direction 105 of the vehicle 100. The processor 520 may also be configured for determining the road slope α of the road 120 in front of the vehicle 100 in the determined driving direction 105. The processor 520 may additionally be configured for adjusting the variable time gap t based on the determined road slope α of the road 120 in front of the vehicle 100 by increasing the variable time gap t when the road slope α is negative, indicating downhill; or by decreasing the variable time gap t when the road slope α is positive, indicating uphill.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 310 may comprise a memory 525 in some embodiments. The optional memory 525 may comprise a physical device utilised to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 500 may comprise a signal transmitter 530. The signal transmitter 530 may be configured for transmitting a control signal over a wired or wireless interface to be received by an engine 540 and/or a brake 550 of the vehicle 100. Thereby, the speed of the vehicle 100, and thereby also the adjustable time gap t to the preceding vehicle 110 may be adjusted.

The previously described steps 401-408 to be performed in the control unit 310 may be implemented through the one or more processors 520 within the control unit 310, together with computer program product for performing at least some of the functions of the steps 401-408. Thus a computer program product, comprising instructions for performing the steps 401-408 in the control unit 310 may perform the method 400 comprising at least some of the steps 401-408 for adjusting a variable time gap t to be kept to a preceding vehicle 110, based on a road slope α in front of the vehicle 100, when the computer program is loaded into the one or more processors 520 of the control unit 310.

The computer program product mentioned above may be provided for instance in the form of a data carrier carrying computer program code for performing at least some of the step 401-408 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

Further, some embodiments may comprise a vehicle 100, comprising the ACC system 500, configured for adjusting a variable time gap t to be kept to a preceding vehicle 110, based on a road slope α in front of the vehicle 100.

The terminology used in the description of the embodiments as illustrated in the accompanying drawings is not intended to be limiting of the described method 400; the control unit 310; the ACC system 500, the computer program and/or the vehicle 100. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements and/or components, but do not preclude the presence or addition of one or more other features, actions, integers, steps, operations, elements, components and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method for use in an adaptive cruise control, ACC, system of a first vehicle, for adjusting a variable time gap (t) to be kept to a second vehicle, the second vehicle preceding the first vehicle, based on a road slope (α), wherein the method comprises:
    determining a geographical position of the first vehicle;
    determining a driving direction of the first vehicle;
    determining the road slope (α) of a road in front of the first vehicle in the determined driving direction;
    adjusting the variable time gap (t) based on the determined road slope (α) of the road in front of the first vehicle by:
    increasing the variable time gap (t) when the road slope (α) is negative, which indicates downhill; or
    decreasing the variable time gap (t) when the road slope (α) is positive, which indicates uphill:
    determining a determined road slope (β) of the road at the determined geographical position of the first vehicle; and further adjusting the variable time gap (t), based on a difference between the determined road slope (β) at the first vehicle and the determined road slope (α) in front of the first vehicle, by:
  increasing the variable time gap (t) when the determined road slope (α) in front of the first vehicle is smaller than the determined road slope (β) at the first vehicle; or
  decreasing the variable time gap (t) when the determined road slope (α) in front of the first vehicle exceeds the determined road slope (β) at the first vehicle.

2. The method according to claim 1, further comprising determining the road slope (α) of the road in front of the first vehicle by extracting from a database road slope data associated with at least one geographical position of the road in front of the determined geographical position of the first vehicle in the determined driving direction.

3. The method according to claim 1, further comprising determining the road slope (α) of the road in front of the first vehicle by extracting from a database road slope data associated with a set of geographical positions of the road in front of the determined geographical position of the first vehicle in the determined driving direction, and computing an average road slope (α).

4. The method according to claim 1, further comprising:
  determining the road slope (α) of the road in front of the first vehicle at a geographical position of the road situated at a distance in front of the first vehicle and, corresponding at least to the time gap (t) at a current velocity of the first vehicle.

5. The method according to claim 1, further comprising:
  estimating if the second vehicle has a higher or a lower weight than the first vehicle; and wherein
  the adjustment of the variable time gap (t) further comprises:
    further increasing the variable time gap (t) in downhill when the second vehicle has a lower weight than the first vehicle; or
    further decreasing the variable time gap (t) in downhill when the second vehicle has a higher weight than the first vehicle.

6. The method according to claim 1, further comprising:
  estimating if the second vehicle has a higher or a lower weight/power ratio than the first vehicle; and
  wherein the adjustment of the variable time gap (t) further comprises:
    further decreasing the variable time gap (t) in uphill when the second vehicle has a higher weight/power ratio than the first vehicle; or
    further increasing the variable time gap (t) in uphill when the second vehicle has a lower weight/power ratio than the first vehicle.

7. The method according to claim 6, wherein the estimation of the weight/power ratio of the second vehicle is made by analyzing a previous hill behavior of the second vehicle.

8. The method according to claim 1, further comprising:
  transmitting a request for obtaining at least one of road slope (α), weight and weight/power ratio to the second vehicle over a wireless communication interface, and wherein the adjustment of the variable time gap (t) is further based on at least one of the obtained value of the road slope (α) at the second vehicle, the weight of the second vehicle, and the weight/power ratio of the second vehicle.

9. The method according to claim 1, further comprising: adjusting the variable time gap (t) linearly with the size of the road slope (α), within predetermined limits.

10. The method according to claim 1, further comprising:
  detecting slippery road conditions; and then adjusting the variable time gap (t) by prolongation when slippery road conditions are detected.

11. A control unit of an adaptive cruise control, ACC, system in a first vehicle, for adjusting a variable time gap (t) to be kept to a second vehicle, the second vehicle preceding the first vehicle, based on a road slope (α), wherein the control unit is configured for:
  determining a geographical position of the first vehicle via a positioning unit;
  determining a driving direction of the first vehicle;
  determining the road slope (α) of the road in front of the first vehicle in the determined driving direction;
  adjusting the variable time gap (t) based on the determined road slope (α) of the road in front of the first vehicle, the adjusting of the variable time gap (t) comprising:
  increasing the variable time gap (t) when the road slope (α) is negative, indicating downhill; or
  decreasing the variable time gap (t) when the road slope (α) is positive, indicating uphill, and
  determining the road slope (β) of the road at the determined geographical position of the first vehicle;
  wherein the variable time gap (t) in the control unit is further adjusted, based on the difference between the determined road slope (β) at the first vehicle and the determined road slope (α) in front of the first vehicle, by:
  increasing the variable time gap (t) when the determined road slope (α) in front of the first vehicle is smaller than the determined road slope (β) at the first vehicle; or
  decreasing the variable time gap (t) when the determined road slope (α) in front of the first vehicle exceeds the determined road slope (β) at the first vehicle.

12. A computer program product comprising a computer program stored on a non-transitory program storage medium, the computer program comprising program code for performing a method according to claim 1 when the computer program is executed in a control unit of an adaptive cruise control, ACC, system in a first vehicle, for adjusting a variable time gap (t) to be kept to a second vehicle, the second vehicle preceding the first vehicle, based on a road slope (α), wherein the control unit is configured for:
  determining a geographical position of the first vehicle via a positioning unit;
  determining a driving direction of the first vehicle;
  determining the road slope (α) of the road in front of the first vehicle in the determined driving direction;
  adjusting the variable time gap (t) based on the determined road slope (α) of the road in front of the first vehicle, the adjusting of the variable time gap (t) comprising:
  increasing the variable time gap (t) when the road slope (α) is negative, indicating downhill; or
  decreasing the variable time gap (t) when the road slope (α) is positive, indicating uphill, and
  determining the road slope (β) of the road at the determined geographical position of the first vehicle;
  wherein the variable time gap (t) in the control unit is further adjusted, based on the difference between the determined road slope (β) at the first vehicle and the determined road slope (α) in front of the first vehicle, by:
  increasing the variable time gap (t) when the determined road slope (α) in front of the first vehicle is smaller than the determined road slope (β) at the first vehicle; or decreasing the variable time gap (t) when the determined road slope (α) in front of the first vehicle exceeds the determined road slope (β) at the first vehicle.

13. An adaptive cruise control, ACC, system in a first vehicle, for adjusting a variable time gap (t) to be kept by the first vehicle to a second vehicle, the second vehicle preceding the first vehicle, based on a road slope (α), wherein the system comprises:

a control unit according to claim 11;

a radar unit, configured for emitting radio waves and receiving reflections of the emitted radio waves, reflected by the second vehicle;

a positioning unit, configured for determining a geographical position of the first vehicle; and a database configured for storing road slope data associated with geographical positions.

14. A first vehicle comprising an ACC system according to claim 13.

15. The method according to claim 5, wherein the estimation of the weight of the second vehicle is made by analyzing previous hill behavior of the second vehicle.

\* \* \* \* \*